United States Patent
Perry et al.

(10) Patent No.: US 7,918,304 B2
(45) Date of Patent: Apr. 5, 2011

(54) STEERING ASSIST FOR A REAR CASTER WHEEL ON A WORK MACHINE

(75) Inventors: Francine J. Perry, Ottumwa, IA (US); Shirish Chobhe, Pune (IN); David V. Rotole, Bloomfield, IA (US)

(73) Assignee: Deere & Company, Moline, IL (US)

( * ) Notice: Subject to any disclaimer, the term of this patent is extended or adjusted under 35 U.S.C. 154(b) by 217 days.

(21) Appl. No.: 12/399,071

(22) Filed: Mar. 6, 2009

(65) Prior Publication Data

US 2010/0224434 A1 Sep. 9, 2010

(51) Int. Cl.
*B62D 5/06* (2006.01)
(52) U.S. Cl. ............... 180/403; 180/420; 280/87.2
(58) Field of Classification Search ........... 180/403, 180/417, 420; 280/87.2
See application file for complete search history.

(56) References Cited

U.S. PATENT DOCUMENTS

| | | | | |
|---|---|---|---|---|
| 3,791,475 A * | 2/1974 | Cadiou | | 180/428 |
| 5,165,496 A * | 11/1992 | Pedersen et al. | | 180/403 |
| 7,210,553 B2 * | 5/2007 | Williams et al. | | 180/402 |
| 7,789,408 B2 * | 9/2010 | Sloan et al. | | 280/124.166 |
| 2009/0152828 A1 * | 6/2009 | Bebernes et al. | | 280/86 |

* cited by examiner

*Primary Examiner* — Kevin Hurley

(57) ABSTRACT

A steering arrangement for a work machine includes a frame, at least one caster wheel assembly carried by the frame, at least one turn assist cylinder, and a turn assist arrangement. Each turn assist cylinder is coupled between the frame and a corresponding caster wheel assembly. The turn assist arrangement includes a steering assembly, a steering assist valve and a transfer gear. The steering assembly includes an output gear which is positionable dependent upon an operator commanded degree of turn. The output gear has exterior teeth. The steering assist valve is configured to selectively operate at least one turn assist cylinder and thereby bias a corresponding caster wheel assembly during an operator commanded turn. The steering assist valve includes an input gear with exterior teeth. The transfer gear includes a first set of peripheral teeth enmeshed with the output gear and a second set of peripheral teeth enmeshed with the input gear. The transfer gear pivots about a common pivot point. The first set of peripheral teeth and the second set of peripheral teeth are each at a common radius from the common pivot point on opposite sides of the transfer gear.

18 Claims, 5 Drawing Sheets

STEERING ASSIST FOR A REAR CASTER WHEEL ON A WORK MACHINE

FIELD OF THE INVENTION

The present invention relates to work machines, and, more particularly, to a steering arrangement for steering such work machines.

BACKGROUND OF THE INVENTION

Work machines may sometimes include one or more caster wheels which are carried by a machine frame and free to rotate about a generally vertical axis 360°. The caster wheel assembly typically includes a shaft defining an axis of rotation, a fork rigidly attached to the bottom end of the shaft, and a caster wheel coupled with the distal ends of the fork. Examples of such work machines include windrowers, combines, lawn mowers, etc.

Self-propelled windrowers are typically driven through a dual-path hydrostatic system. Speed changes are made by adjusting the speed of both drive (front) wheels simultaneously. Direction changes are made by adjusting the relative speed of the drive wheels. The rear wheels of the machine are castered to allow the machine to pivot during direction changes.

When direction changes are made, hydraulic pressure builds in one drive wheel circuit to increase speed and is reduced in the other drive wheel circuit to lower the speed. This relative pressure difference prevails until the inertia of the machine and the inherent turn resistance of the casters is overcome. If the turn resistance is high enough to produce a noticeable delay in the reaction to the steering wheel input, control of the machine can be difficult.

Turn resistance of the caster wheels results from friction in the pivot of the caster assembly and friction between the castered wheels and the ground. Reaction delay can be particularly pronounced if the machine is operated without the cutting platform because the added weight on the casters results in increased turn resistance. Low inflation pressures (e.g., 14 psi) are often specified in the castered tires to improve ride quality. This further increases turn resistance if the machine is operated with the platform removed.

Steering characteristics are dependent on such things as steering linkages, hydrostatic pump reaction time, the machine's turning inertia, and caster turn resistance. There is a tendency for a steering input to have a slow reaction (understeer) at initiation, then a tendency to keep turning (oversteer) when the input is stopped or reversed. Because of this, control of the machine can be difficult, particularly at higher speeds. Windrowers typically have a maximum speed in transport in the 15 mph range. Transport speeds up to 25 miles per hour (mph) would be an advantage in the market. This requires better machine controllability at higher speeds without sacrificing the agility of the current system (spin steer) at lower speeds.

It is known to provide a turn assist arrangement for the rear caster wheels on a work machine. To that end, reference is hereby made to U.S. patent application Ser. No. 11/957,800, entitled "STEERING ASSIST FOR A REAR CASTER WHEEL ON A WORK MACHINE", filed on Dec. 17, 2007, which is assigned to the assignee of the present invention and incorporated herein by reference (hereinafter the '800 application). With a turn assist arrangement as disclosed in the '800 application, a steering assist valve which controls a flow of hydraulic oil to the pair of steering assist cylinders is coupled directly to the steering wheel column. Typically the operator's cab is positioned in close proximity overlying the frame of the work machine, and the space available for the steering assist valve can be very limited.

What is needed in the art is a steering assist arrangement for a work machine having rear caster wheels with improved versatility to accommodate tight space restrictions.

SUMMARY OF THE INVENTION

The invention in one form is directed to a work machine including a frame, at least one drive wheel carried by the frame, at least one caster wheel assembly carried by the frame, at least one turn assist cylinder, and a turn assist arrangement. Each turn assist cylinder is coupled between the frame and a corresponding caster wheel assembly. The turn assist arrangement includes a steering assembly having an output gear, a steering assist valve and a transfer gear. The output gear is positionable dependent upon an operator commanded degree of turn. The steering assist valve is configured to selectively operate at least one turn assist cylinder and thereby bias the corresponding caster wheel assembly during an operator commanded turn. The steering assist valve includes an input gear. The transfer gear directly interconnects the output gear with the input gear.

The invention in another form is directed to a steering arrangement for a work machine including a frame, at least one caster wheel assembly carried by the frame, at least one turn assist cylinder, and a turn assist arrangement. Each turn assist cylinder is coupled between the frame and a corresponding caster wheel assembly. The turn assist arrangement includes a steering assembly, a steering assist valve and a transfer gear. The steering assembly includes an output gear which is positionable dependent upon an operator commanded degree of turn. The output gear has exterior teeth. The steering assist valve is configured to selectively operate at least one turn assist cylinder and thereby bias a corresponding caster wheel assembly during an operator commanded turn. The steering assist valve includes an input gear with exterior teeth. The transfer gear includes a first set of peripheral teeth enmeshed with the output gear and a second set of peripheral teeth enmeshed with the input gear. The transfer gear pivots about a common pivot point. The first set of peripheral teeth and the second set of peripheral teeth are each at a common radius from the common pivot point on opposite sides of the transfer gear.

DETAILED DESCRIPTION OF THE INVENTION

Figure 1:
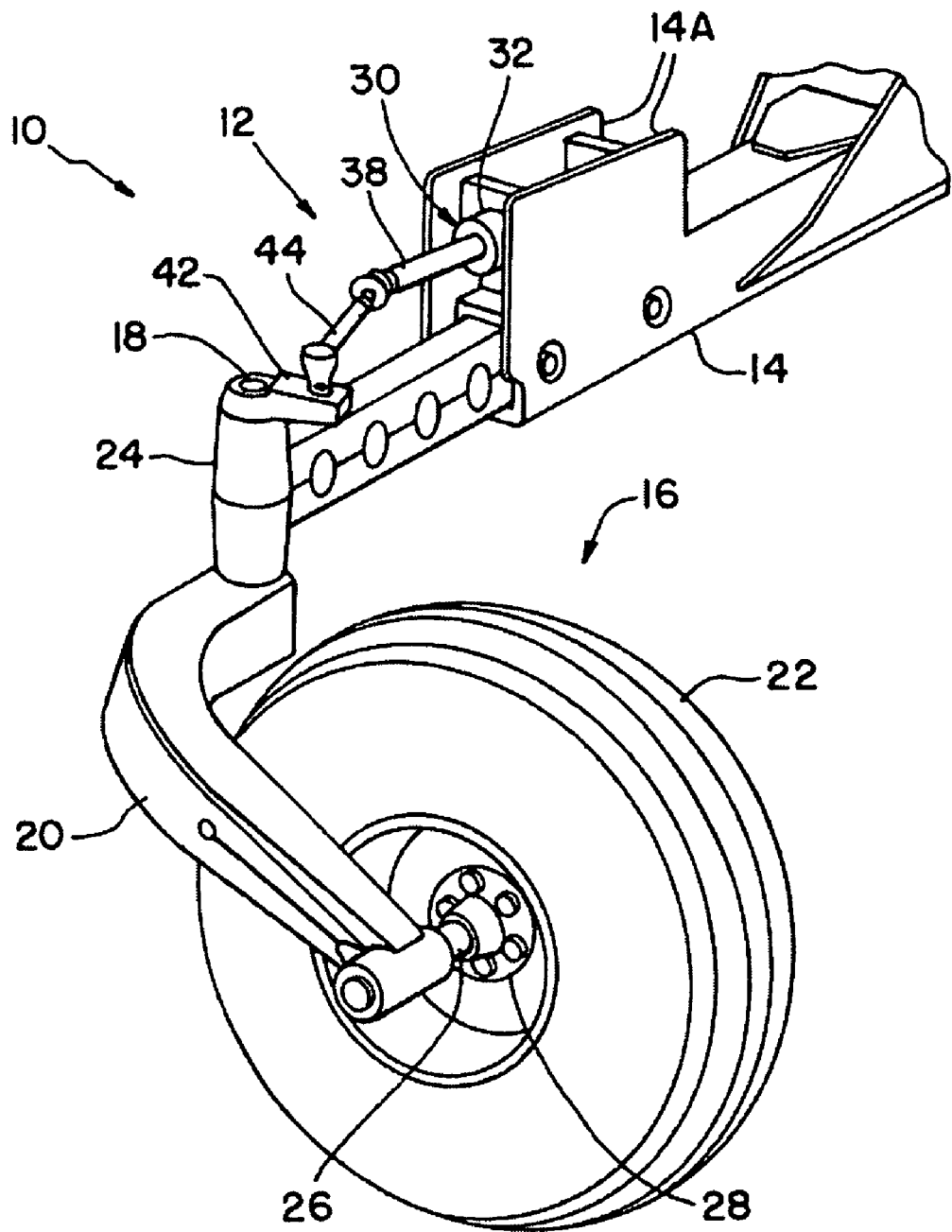
FIG. 1 is a perspective view of a portion of a work machine incorporating an embodiment of a turn assist arrangement of the present invention.
Figure 2:
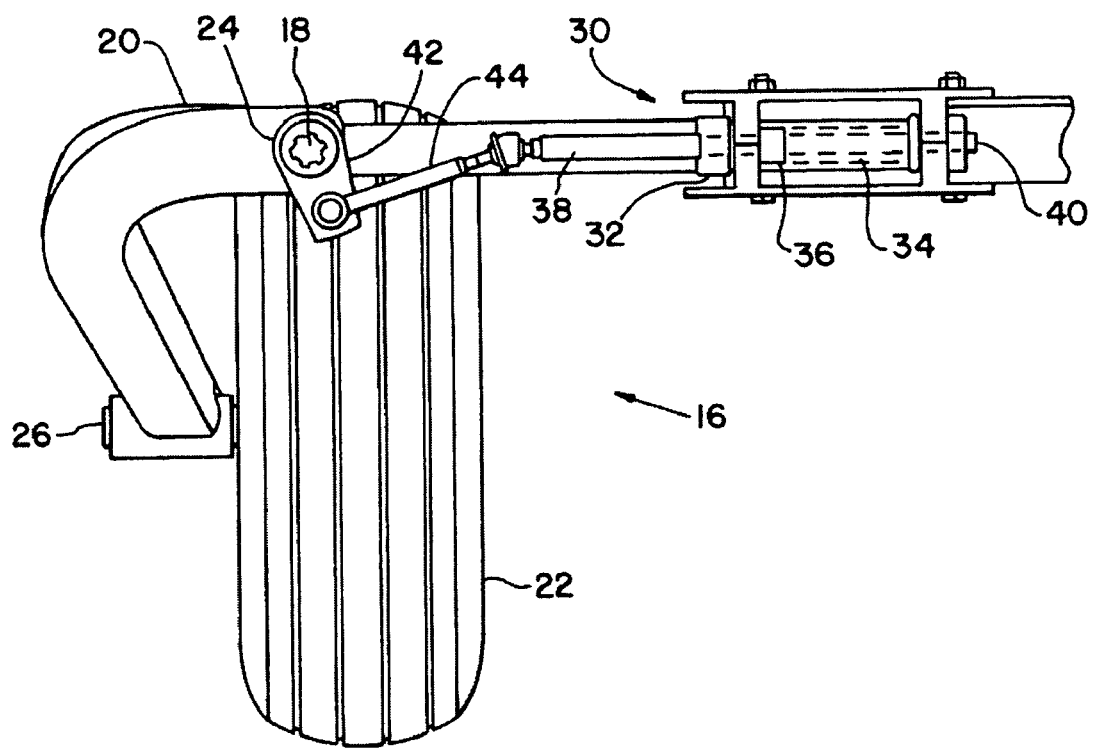
FIG. 2 is a top view of the portion of the work machine shown in FIG. 1.
Figure 3:
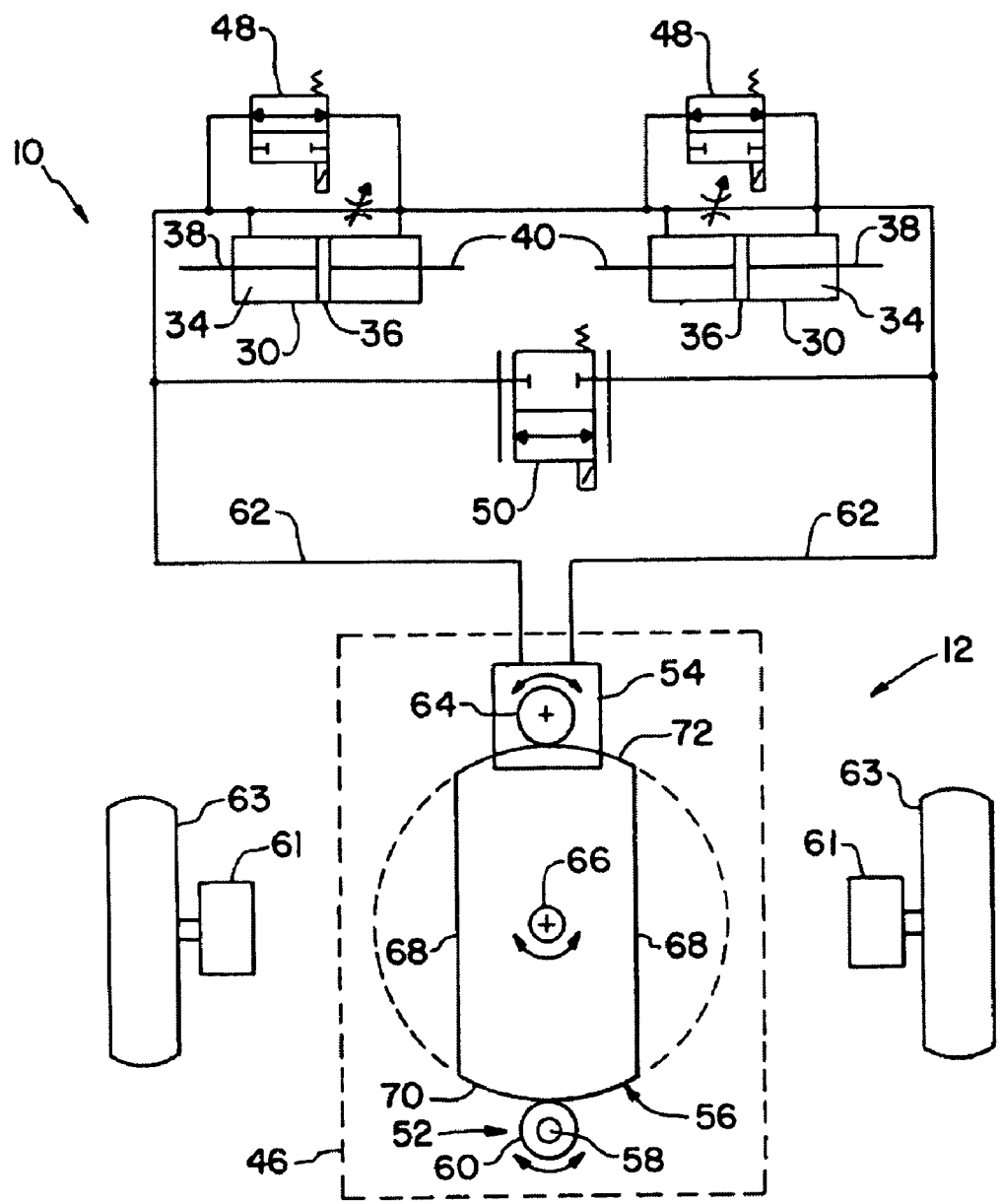
FIG. 3 is a schematic illustration of an embodiment of a turn assist arrangement of the present invention.

Referring now to the drawings, and more particularly to FIGS. 1-3, there is shown a portion of a work machine 10 incorporating an embodiment of a turn assist arrangement 12 of the present invention. Work machine 10 can be any type of self-propelled work machine using one or more caster wheels, such as a windrower, combine, lawn mower, etc. In the embodiment shown, the left rear portion of a work machine in the form of a windrower 10 is shown for illustration.

Windrower 10 includes a frame 14 carrying typical components (not shown) such as an operator's station, internal combustion engine, etc. A cutting platform is typically detachably mounted at the front end of the machine below the operator's station. The engine compartment is typically mounted behind the operator's station and above a pair of caster wheel assemblies 16. Only the left rear caster wheel 16 is shown in FIGS. 1 and 2 for simplicity, the right rear caster wheel being configured substantially identical in the illustrated embodiment. Some differences in the configurations of the caster wheel assemblies 16 are possible, as will be described in more detail below.

Each caster wheel assembly 16 includes a pivotable shaft 18, a wheel arm 20 and a caster wheel 22 coupled with wheel arm 20. Shaft 18 is rotatably carried within a collar 24 which is welded or otherwise rigidly affixed to frame 14. As shown in FIG. 1, the machine frame 14 may include a telescoping axle having an outboard end carrying collar 24. Wheel arm 20 is shown as a single arm which curves around to the side of wheel 22, thus putting wheel 22 generally in line with shaft 18. Wheel arm 20 can also be configured as a fork with distal ends on opposite sides of wheel 22. The lower or distal end of wheel arm 20 carries a stub shaft 26, which in turn carries a wheel hub 28 for mounting wheel 22 in known fashion.

Caster wheel assembly 16 shown in FIGS. 1 and 2 is just one type of caster wheel assembly that can be used with the present invention. Further details of caster wheel assembly 16, as well as a description of other non-inclusive types of caster wheel arrangements which can be used with the present invention are described in greater detail in the '800 application referenced above.

Windrower 10 includes a linear actuator to be described in more detail hereinafter, but may also be configured as a rotary or other type actuator, as will become more apparent hereinafter. Windrower 10 includes one or more turn assist cylinders 30 which are coupled between frame 14 and a corresponding caster wheel assembly 16. In the embodiment shown, windrower 10 has two turn assist cylinders 30 coupled to respective caster wheel assemblies. Each turn assist cylinder 30 biases a corresponding caster wheel assembly 16 during an operator commanded turn.

Each turn assist cylinder 30 is in the form of a two-way cylinder with a housing 32 defining an inner chamber 34, a piston 36 slidably disposed in inner chamber 34, and a rod 38 extending from piston 36 through housing 32 (interior components of turn assist cylinder 30 are shown in phantom lines in FIG. 2). Housing 32 is carried by mounting plates 14A, which are considered for practical purposes to be part of frame 14. In the embodiment shown, each turn assist cylinder 30 also includes a second rod 40 extending from piston 36 through housing 32. Rod 38 and second rod 40 are disposed on opposite sides of piston 36, with second rod 40 providing an equal fluid displacement from inner chamber 34 regardless of a travel direction of piston 36. It will be understood, however, that a single piston rod 38 may be utilized.

Windrower 10 is shown with a pair of turn assist cylinders 30, with each turn assist cylinder 30 being coupled between frame 14 and a corresponding caster wheel assembly 16. However, it is also possible to configure windrower 10 with a single turn assist cylinder 30 coupled between frame 14 and one caster wheel assembly 16, the other caster wheel being free turning. Alternatively, windrower 10 may be configured with a single turn assist cylinder 30 coupled between frame 14 and one caster wheel assembly 16, the one caster wheel assembly being coupled via a tie rod or the like with the other caster wheel assembly.

Windrower 10 also includes a pivot arm 42 associated with each caster wheel shaft 18, and a ball linkage 44 interconnecting each piston rod 38 with a corresponding pivot arm 42. Pivot arm 42 is rigidly affixed to and extends radially outward from the top end of shaft 18 and rotates or pivots therewith, such as through a suitable keyed connection. The length of pivot arm 42 may be selected dependent upon the desired amount of turn assist force, etc. Pivot arm 42 has an opposite, distal end which is coupled with one end of ball linkage 44, which in turn has an opposite end which is coupled with the outer end of piston rod 38. Ball linkage 44 may have an adjustable length using a threaded rod and lock nut arrangement, as shown. Windrower 10 is thus configured with a stroke length of rod 38, ball linkage 44 and pivot arm 42 allowing full 360 degree rotational movement of caster wheel 22 about the axis of shaft 18. This may be important when changing directions of windrower 10 from forward to reverse, or vice versa, or for side loads applied to wheel 22 due to ground terrain variations, etc.

Referring now to FIG. 3, there is shown a schematic illustration of turn assist arrangement 12 for caster wheels 22. Turn assist arrangement 12 includes a hydraulic steering circuit 46. Turn assist cylinders 30 are coupled in series using a fluid tie rod arrangement. A pair of direction change valves 48 are coupled in parallel with a corresponding turn assist cylinder 30, and a proportional valve 50 is connected in parallel between turn assist cylinders 30. Proportional valve 50 is open at lower ground speeds to allow free parallel movement of turn assist cylinders 30. Proportional valve 50 begins to close at approximately the same speed as direction change valves 48 close. Proportional valve 50 closes proportional to increasing speed, then remains closed at higher speeds. Proportional valve 50 softens the transition between the dual path hydrostatic system at low speeds and the rear steer system turn assist at higher transport speeds.

Figure 4:
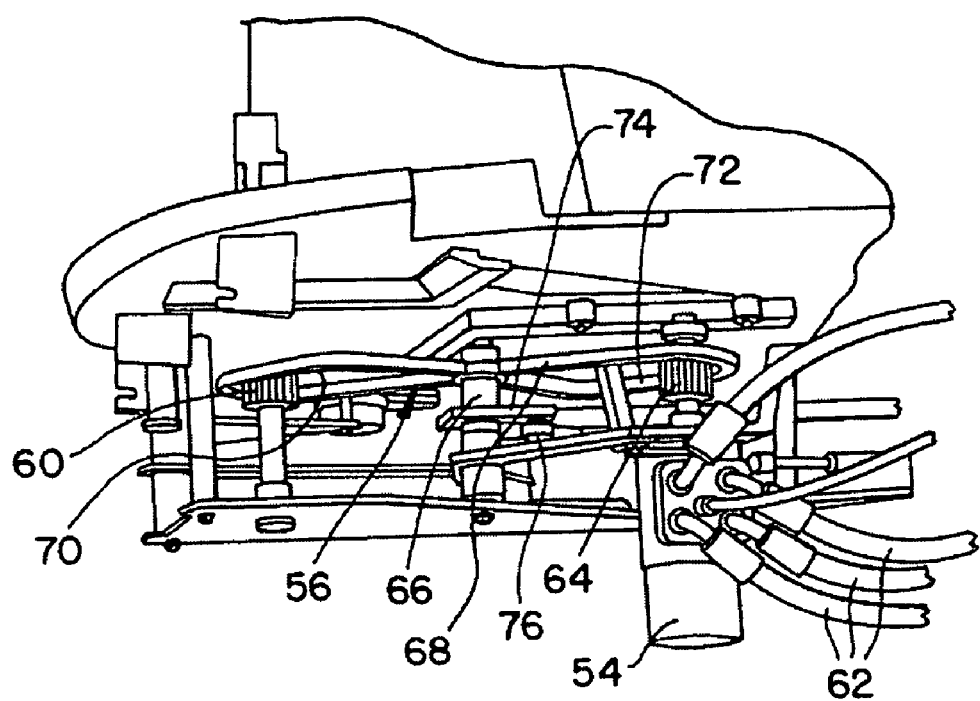
FIG. 4 is a perspective view of the turn assist arrangement shown in FIG. 3.
Figure 5:
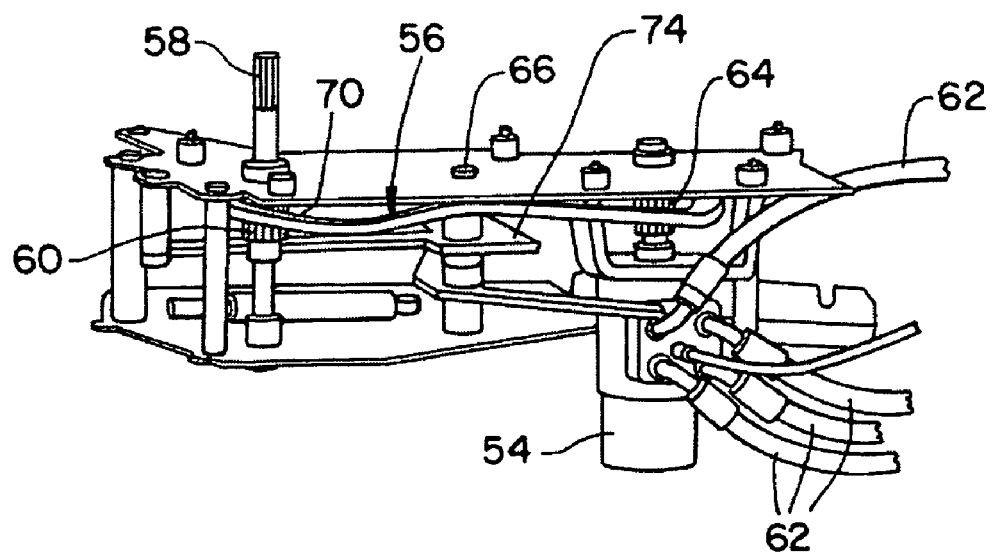
FIG. 5 is another perspective view of the turn assist arrangement shown in FIG. 4.
Figure 6:
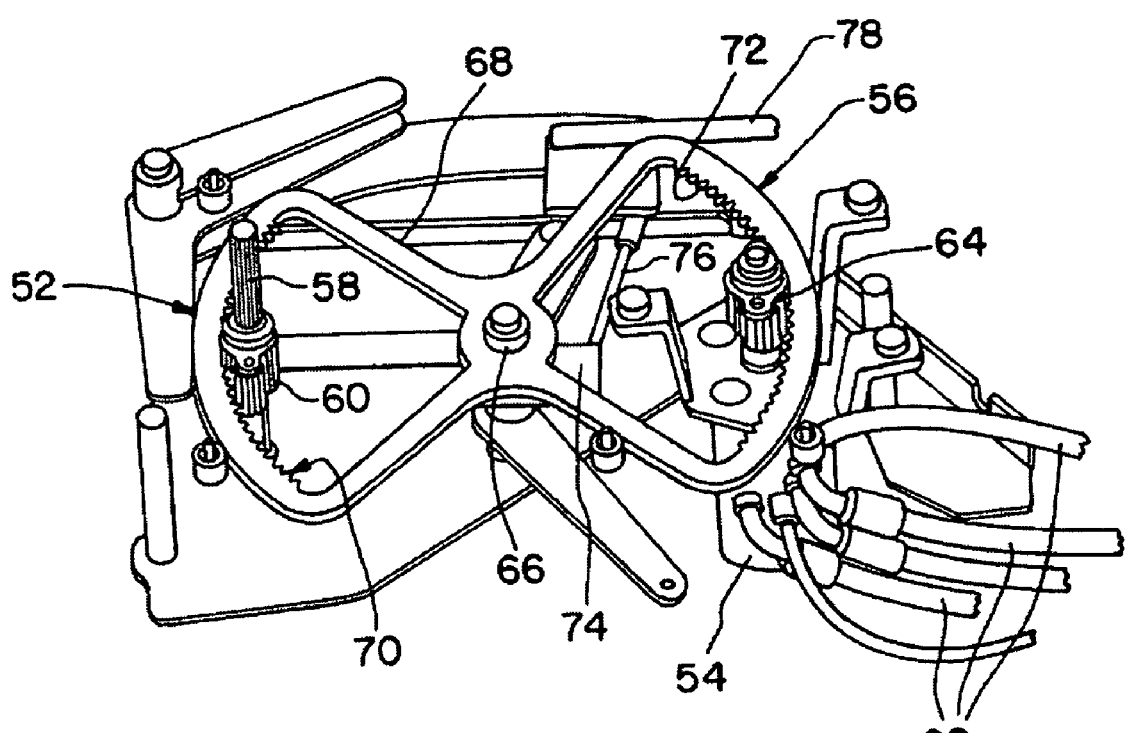
FIG. 6 is yet another perspective view of the turn assist arrangement shown in FIGS. 4 and 5, with the top plate removed.

Referring now to FIGS. 4-6, conjunctively, hydraulic steering circuit 46 generally includes a steering assembly 52, steering assist valve 54, and transfer gear 56. Steering assembly 52 includes a spline shaft 58 and an output gear 60. Spline shaft 58 is directly coupled with the bottom end of a steering wheel column having an operator input with an angular orientation corresponding to a desired direction of travel of windrower 10. The steering wheel column also provides output signals for control of respective drive wheel motors 61, each coupled with and driving a corresponding drive wheel 63. Output gear 60 is rigidly attached to the bottom end of spline shaft 58, and is likewise positionable dependent upon an operator commanded degree of turn. Output gear 60 has a plurality of exterior teeth (not individually numbered) with a tooth profile that can vary depending on the application.

Steering assist valve 54 includes a number of hydraulic hoses 62 which may be respectively coupled with a corresponding turn assist cylinder 30. Steering assist valve 54 is configured to selectively operate the turn assist cylinders 30 and thereby bias a corresponding caster wheel assembly 16 during an operator commanded turn. Steering assist valve 54 includes an input gear 64 with a plurality of exterior teeth with a predetermined tooth profile depending upon the application.

Transfer gear 56 generally is in the form of a large gear which pivots about a common pivot point 66, and has a pair of truncated sides 68 on opposite sides thereof (with the truncated portion of the circular gear being shown in dashed lines in FIG. 3). Transfer gear 56 functions to interconnect output gear 60 with input gear 64 located at a position away from steering assembly 52. The arrangement of transfer gear 56 allows steering assist valve 54 to be located other than directly underneath steering assembly 52, thereby allowing an increased size and displacement volume of steering assist valve 54.

Transfer gear 56 includes a first set of peripheral teeth 70 which enmesh with output gear 60, and a second set of peripheral teeth 72 which enmesh with input gear 64. The first set of peripheral teeth 70 and second set of peripheral teeth 72 are disposed on opposite sides of transfer gear 56, with the truncated sides 68 extending therebetween. In FIG. 3, the first set of peripheral teeth 70 and second set of peripheral teeth 72 are each shown as exterior teeth enmeshed with the corresponding output gear 60 and input gear 64. In another embodiment shown in FIGS. 4-6, the first set of peripheral teeth 70 and second set of peripheral teeth 72 are each shown as radially inwardly facing teeth which enmesh with the outside of the corresponding output gear 60 and input gear 64. Configured as shown in FIGS. 4-6, transfer gear 56 is generally bow-tie shaped. Of course, it is also possible to have one of a set of peripheral teeth 70 or 72 as exterior teeth, and the other of a set of peripheral teeth 70 or 72 as radially inwardly facing teeth.

Transfer gear 56 is also used in the control of drive wheels 63. A linkage 74 which pivots about pivot point 66 pivots concurrently with transfer gear 56 (FIGS. 4 and 6). Linkage 74 is coupled via an intermediate linkage 76 with a pump control rod 78 used to control the flow of hydraulic fluid to drive wheel motors 61. The differential flow of hydraulic fluid to drive wheel motors 61 provides propulsion and primary turning of windrower 10 using drive wheels 63.

During operation of windrower 10, hydraulic steering assembly 52 controls operation of the dual path hydrostatic drive to drive wheel motors 61 in known manner. Concurrently, steering assembly 52 pivots transfer gear 56 about pivot point 66, depending upon the position of the steering wheel. Transfer gear 56 in turn rotates input gear 64 to control operation of turn assist cylinders 30.

Having described the preferred embodiment, it will become apparent that various modifications can be made without departing from the scope of the invention as defined in the accompanying claims.

The invention claimed is:

1. A work machine, comprising:
   a frame;
   at least one drive wheel carried by said frame;
   at least one caster wheel assembly carried by said frame;
   at least one turn assist cylinder, each said turn assist cylinder coupled between said frame and a corresponding said caster wheel assembly; and
   a turn assist arrangement, including:
      a steering assembly including an output gear which is positionable dependent upon an operator commanded degree of turn;
      a steering assist valve configured to selectively operate at least one said turn assist cylinder and thereby bias said corresponding caster wheel assembly during an operator commanded turn, said steering assist valve including an input gear; and
      a transfer gear directly interconnecting said output gear with said input gear.

2. The work machine of claim 1, wherein said transfer gear includes a first set of peripheral teeth enmeshed with said output gear and a second set of peripheral teeth enmeshed with said input gear.

3. The work machine of claim 2, wherein said transfer gear pivots about a common pivot point, and said first set of peripheral teeth and said second set of peripheral teeth are each at a common radius from said common pivot point on opposite sides of said transfer gear.

4. The work machine of claim 3, wherein said output gear and said input gear each have exterior teeth, and wherein said first set of peripheral teeth and said second set of peripheral teeth are each radially inwardly facing teeth.

5. The work machine of claim 3, wherein said transfer gear has a pair of truncated sides on opposite sides of said transfer gear, between said first set of peripheral teeth and said second set of peripheral teeth.

6. The work machine of claim 5, wherein said transfer gear is generally bow-tie shaped.

7. The work machine of claim 1, wherein said output gear is connected to a steering wheel column.

8. The work machine of claim 1, wherein said input gear extends from said steering assist valve, and said steering assist valve includes a plurality of hydraulic hoses, each said hose being fluidly coupled with a respective said turn assist cylinder.

9. The work machine of claim 1, wherein said at least one drive wheel comprises a pair of drive wheels, and said steering assist arrangement is one of:
   integral with a dual-path hydrostatic system associated with said drive wheels; and
   a stand-alone hydraulic circuit which is separate from said dual-path hydrostatic system.

10. The work machine of claim 1, wherein said at least one turn assist cylinder comprises two turn assist cylinders, each said turn assist cylinder coupled between said frame and a corresponding said caster wheel assembly.

11. A steering arrangement for a work machine, comprising:
   a frame;
   at least one caster wheel assembly carried by said frame; and
   at least one turn assist cylinder, each said turn assist cylinder coupled between said frame and a corresponding said caster wheel assembly;
   a turn assist arrangement, including:
      a steering assembly including an output gear which is positionable dependent upon an operator commanded degree of turn, said output gear having exterior teeth;
      a steering assist valve configured to selectively operate at least one said turn assist cylinder and thereby bias said corresponding caster wheel assembly during an operator commanded turn, said steering assist valve including an input gear with exterior teeth; and
      a transfer gear including a first set of peripheral teeth enmeshed with said output gear and a second set of peripheral teeth enmeshed with said input gear, said transfer gear pivoting about a common pivot point, said first set of peripheral teeth and said second set of peripheral teeth each being at a common radius from said common pivot point on opposite sides of said transfer gear.

12. The work machine of claim 11, wherein said first set of peripheral teeth and said second set of peripheral teeth are each radially inwardly facing teeth.

13. The work machine of claim 11, wherein said transfer gear has a pair of truncated sides on opposite sides of said transfer gear, between said first set of peripheral teeth and said second set of peripheral teeth.

14. The work machine of claim 13, wherein said transfer gear is generally bow-tie shaped.

15. The work machine of claim 11, wherein said output gear is connected to a steering wheel column.

16. The work machine of claim 11, wherein said input gear extends from said steering assist valve, and said steering assist valve includes a plurality of hydraulic hoses, each said hose being fluidly coupled with a respective said turn assist cylinder.

17. The work machine of claim 11, wherein said at least one drive wheel comprises a pair of drive wheels, and said steering assist arrangement is one of:
    integral with a dual-path hydrostatic system associated with said drive wheels; and
    a stand-alone hydraulic circuit which is separate from said dual-path hydrostatic system.

18. The work machine of claim 11, wherein said at least one turn assist cylinder comprises two turn assist cylinders, each said turn assist cylinder coupled between said frame and a corresponding said caster wheel assembly.

* * * * *